(12) United States Patent
Becker

(10) Patent No.: US 10,987,870 B2
(45) Date of Patent: Apr. 27, 2021

(54) PRINTING SYSTEM FOR THREE-DIMENSIONAL OBJECTS

(71) Applicant: ABB Technology AG, Zurich (CH)

(72) Inventor: Oliver Becker, Schriesheim (DE)

(73) Assignee: ABB Schweiz AG, Baden (CH)

(*) Notice: Subject to any disclaimer, the term of this patent is extended or adjusted under 35 U.S.C. 154(b) by 1188 days.

(21) Appl. No.: 14/910,264

(22) PCT Filed: Jun. 26, 2014

(86) PCT No.: PCT/EP2014/063554
§ 371 (c)(1),
(2) Date: Feb. 5, 2016

(87) PCT Pub. No.: WO2015/018562
PCT Pub. Date: Feb. 12, 2015

(65) Prior Publication Data
US 2016/0176115 A1    Jun. 23, 2016

(30) Foreign Application Priority Data
Aug. 8, 2013 (EP) .................... 13003959

(51) Int. Cl.
B29C 64/393    (2017.01)
B25J 9/16      (2006.01)
G05B 19/4099   (2006.01)
B29C 64/112    (2017.01)
B29C 67/00     (2017.01)
B33Y 10/00     (2015.01)
B33Y 50/02     (2015.01)
B29L 31/00     (2006.01)

(52) U.S. Cl.
CPC .......... *B29C 64/393* (2017.08); *B25J 9/1679* (2013.01); *B29C 64/112* (2017.08);
(Continued)

(58) Field of Classification Search
CPC ....... B25J 9/06; B25J 9/02; B25J 9/023; B25J 11/0075; B29C 67/0088; B29C 64/112;
(Continued)

(56) References Cited

U.S. PATENT DOCUMENTS 4,763,276 A * 8/1988 Perreirra ............... B25J 9/1653
                                                   700/254
5,362,427 A * 11/1994 Mitchell, Jr. ............. B22F 3/10
                                                   264/497

(Continued)

FOREIGN PATENT DOCUMENTS

EP    2329935 A1       6/2011
WO    WO 2012042470 A1  4/2012

Primary Examiner — Katelyn B Whatley
Assistant Examiner — Cedrick S Williams
(74) Attorney, Agent, or Firm — Leydig, Voit & Mayer, Ltd.

(57) ABSTRACT

A printing system for three-dimensional objects has a control unit for storing and executing a robot program and an industrial robot which is controlled by the control unit and which has an arm with several members, wherein the tip of the arm is movable along a predetermined movement path according to path data of the robot program. A printing unit is mounted on the tip of the robot arm and is controlled by the control unit, which has at least one print nozzle for applying pointwise a respective portion of a print material at respective coordinates according to object data of the robot program.

15 Claims, 2 Drawing Sheets

(52) U.S. Cl.
CPC ...... B29C 67/0088 (2013.01); G05B 19/4099 (2013.01); *B29L 2031/00* (2013.01); *B33Y 10/00* (2014.12); *B33Y 50/02* (2014.12); *G05B 2219/45083* (2013.01); *G05B 2219/49023* (2013.01)

(58) Field of Classification Search
CPC ....... B29C 64/20; B29C 64/10; B29C 64/386; B29C 64/393; B29C 64/343; B29C 64/30; B29C 64/205; B29C 64/227; B29C 64/09; G05B 19/4099; G05B 19/19; G05B 19/4083; B41J 2/135; B33Y 10/00
See application file for complete search history.

(56) References Cited

U.S. PATENT DOCUMENTS

| | | | |
|---|---|---|---|
| 6,028,410 A | 2/2000 | Leavitt et al. | |
| 8,838,273 B2* | 9/2014 | Hvass | G05D 1/027 700/245 |
| 2002/0062909 A1* | 5/2002 | Jang | B29C 64/165 156/155 |
| 2005/0100680 A1* | 5/2005 | Bustgens | B05C 5/027 427/427.1 |
| 2007/0062383 A1* | 3/2007 | Gazeau | B41J 3/4073 101/35 |
| 2007/0228592 A1* | 10/2007 | Dunn | B29C 64/393 264/40.4 |
| 2008/0125909 A1* | 5/2008 | Eickmeyer | B05B 12/126 700/250 |
| 2009/0074979 A1* | 3/2009 | Krogedal | G05B 19/404 427/427.2 |
| 2010/0143089 A1* | 6/2010 | Hvass | B05B 13/005 414/754 |
| 2012/0219699 A1* | 8/2012 | Pettersson | B05B 12/122 427/8 |
| 2014/0074289 A1* | 3/2014 | Xiao | B25J 9/163 700/254 |
| 2014/0113075 A1* | 4/2014 | Maillot | B41J 3/4073 427/256 |
| 2017/0341183 A1* | 11/2017 | Buller | B33Y 30/00 |

* cited by examiner

PRINTING SYSTEM FOR THREE-DIMENSIONAL OBJECTS

CROSS-REFERENCE TO RELATED APPLICATIONS

This application is a U.S. national stage application under 35 U.S.C. § 371 of International Application No. PCT/EP2014/063554, filed on Jun. 26, 2014, and claims benefit to European Patent Application No. 13 003 959.7, filed on Aug. 8, 2013. The International Application was published in English on Feb. 12, 2015, as WO 2015/018562 A1 under PCT Article 21(2).

FIELD

The invention relates to a printing system for three-dimensional objects.

BACKGROUND

It is known that 3D printing systems are suitable for example for 3D prototyping. This enables a fast and easy production of a workpiece for testing purposes before a series production is starting. But also for the production of a small series of individual workpieces 3D printing systems are suitable. There are several types of 3D printing systems. One type consists mainly of a print nozzle and a Cartesian manipulator, which is foreseen to move the print nozzle in xyz-direction. Thus a typical Cartesian manipulator comprises three linear degrees of freedom in movement. The structure of an 3D object to be printed is stored for example in a kind of three-dimensional matrix wherein for each coordinate the information is provided, whether a portion of print material has to be applied at the respective coordinate or not. While printing the respective portion of print material is typically in a liquid state or comparable therewith, whereas the print material is hardened after application, so that point- and layerwise a solid object is printed.

Disadvantageously within this state of the art is that the size of objects which can be printed is limited to a certain size, for example 50 cm in xyz-direction, since typical Cartesian manipulators have a corresponding limited size. Objects of a larger dimension such as for example 2 m×2 m×3 m are not printable with a typical Cartesian manipulator. The objective of the invention consists in providing a system for easily printing larger 3D objects.

SUMMARY

An aspect of the invention provides a printing system for three-dimensional objects, the system comprising: a control unit configured to store and execute a robot program; an industrial robot which is controlled by the control unit, the industrial robot including an arm including a plurality of members, the arm including a tip which is movable along a predetermined movement path according to path data of the robot program; a printing unit, mounted on the tip of the arm, and controlled by the control unit, the printing unit including a print nozzle configured to apply pointwise a respective portion of a print material at respective coordinates according to object data of the robot program; and an anticipatory determination unit, configured for anticipatory determination of a real actual position of the print nozzle, wherein the system is configured to suppress an application of a respective portion of print material if a difference between a anticipatory determined real actual position of the print nozzle and a respective coordinate according to the object data of the robot program exceeds a certain limit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
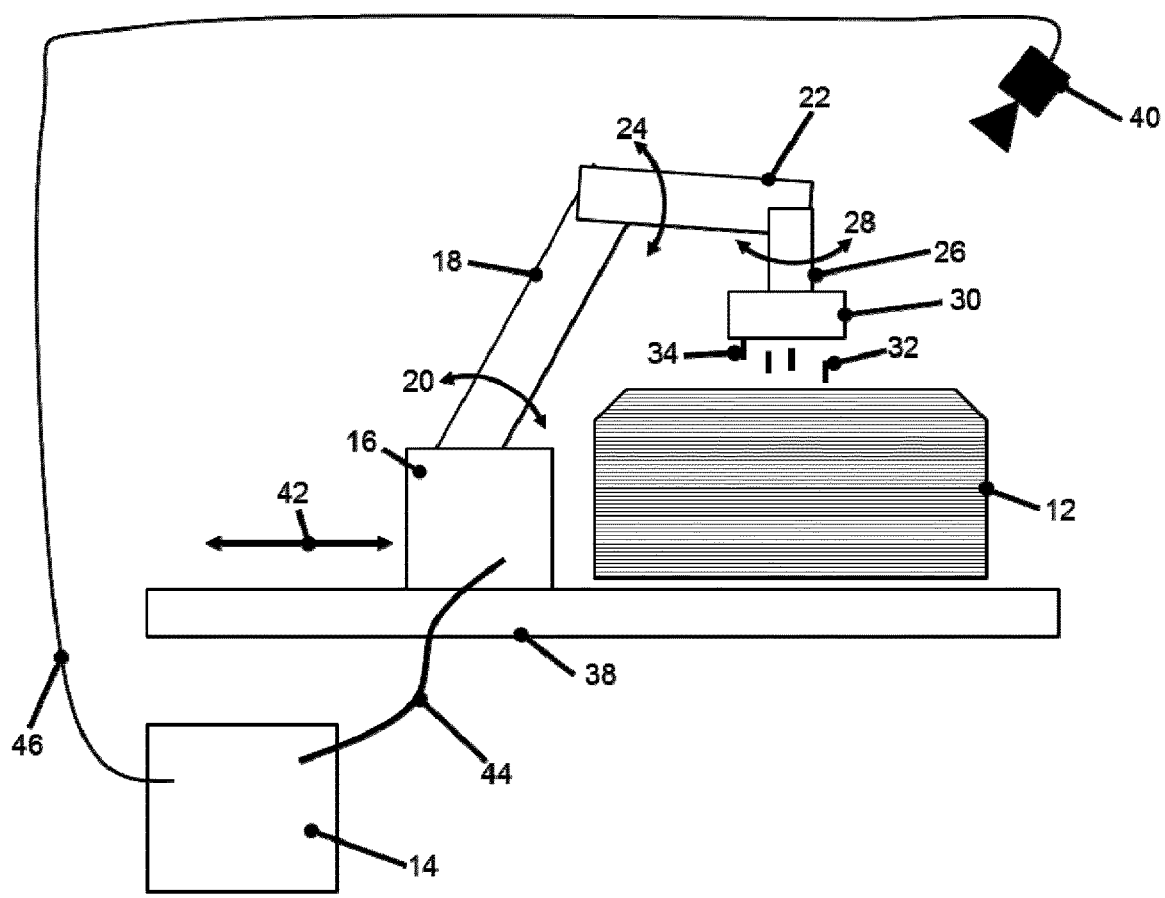
FIG. 1 shows an exemplary printing system.

An aspect of the invention solves problems discussed in the Background by a printing system for three-dimensional objects of the aforementioned kind, providing a control unit for storing and executing a robot program, by an industrial robot which is controlled by the control unit and which comprises an arm with several members that's tip is movable along a predetermined movement path according to path data of the robot program and by a printing unit which is mounted on the tip of the robot arm and controlled by the control unit, which comprises at least one print nozzle for applying pointwise a respective portion of a print material at respective coordinates according to object data of the robot program.

An aspect of the invention is to use an industrial robot with its large operational range as manipulator for carrying the printing unit along the predetermined movement path. A typical industrial robot has a working space of for example 3 m around a rotational base and comprises for example four, five, six or even seven degrees of freedom in movement. A robot is controlled by a control unit respectively a robot controller. This is a computing device which is capable of running a software program containing data of a desired robot movement for example. The arm of such a robot consists for example of a rotary base and a first and second arm-member, which are connected chain-like in a pivotable manner. Both arm-members might have a length of for example 1.5 m each. Each member typically comprises an own drive and causes a respective degree of freedom in movement. Thus it is possible to reach each XYZ-coordinate within the workspace of the robot with the end of the second arm-member.

Preferably a paint robot is used within the printing system according to the invention. Typical industrial robots for handling are foreseen for moving their arm in between a start point and an end point. The kind of movement in between those points is not of significant importance. A paint robot on the other side is foreseen to move its arm with a preferably constant speed along a given movement path. Here not only the start and end point of a movement are of importance, moreover the whole movement inbetween those points is of importance. If a paint robot is slower than desired, the paint result will be too thick, if the movement path is deviating from its desired way, the paint result will be inhomogeneous. Paint robots are prepared to have a high accuracy along the whole movement path and are therefore highly suitable to be used as manipulator for a print unit for printing of three-dimensional objects. Suitable robots are for example the ABB IRB5000 or IRB5500.

Normally at the end of the second member a wrist is foreseen, which provides additional degrees of freedom in movement for orienting a tool respectively a printing unit which is foreseen at the outer end of the wrist. Thus it is possible to take advantage of the typically large working space of an industrial robot for printing of three-dimensional objects.

According to an embodiment of the invention the industrial robot respectively its arm comprises at least six robot members with six degrees of freedom in movement. If a robot arm comprises six degrees of freedom in movement, it is possible to reach each point within its working space in every orientation. Thus a certain over-redundancy in flexibility compared with a Cartesian manipulator with its three degrees of freedom in movement is given, which does not provide the possibility of orienting a tool. This over-redundancy can be used for example in an advantageous way to make the programming of a robot movement path more flexible.

When applying a portion of print material there is a difference in between the coordinate of the nozzle and the respective impact coordinate of the portion of print material on the surface of the three-dimensional object to be printed. Typically the robot control is prepared in that way, that the desired impact coordinates of the portion of print material are given within the desired movement path whereas the real movement path of the print nozzle is determined in that way, that it is in a fixed distance to the respective impact coordinates of the print material to avoid any collisions. The virtual impact point, which is always in a fixed distance to the print nozzle, is known as a TCP (Tool Center Point).

Since an impact coordinate is not necessarily related to an orientation, from which direction the portion of print material has to be applied, it is possible to apply a portion of print material to a certain coordinate from different coordinates of the print nozzle with respective different orientations. This enables for example the possibility to correct potential deviations of the actual position of the print nozzle by a respective adapted orientation of the print nozzle. Thus the over-redundancy of the degrees of freedom in movement of an industrial robot is used to improve its accuracy in an advantageous way.

According to a further embodiment of the invention means for anticipatory determining the real actual position of the at least one print nozzle respectively the TCP are foreseen. Thus deviations of the real position from the respective desired position of the print nozzle respectively the TCP can easily detected. Due to its large working range and the composed several degrees of freedom in movement an industrial robot might subject to some deviation in between the desired predetermined movement path and the real movement path. Those deviations are of high importance for the result of a three-dimensional object to be printed, since a misplaced portion of print material will reduce the quality of the printed three-dimensional object.

According to a further embodiment of the invention the means for anticipatory determining the real actual position comprise acceleration sensors, resolvers, encoders or laser interferometers for the respective axis of the robot, wherein respective measurement values therefrom are provideable to the control unit, which is prepared to derive anticipatory the real actual position of the at least one print nozzle therefrom.

Resolvers are typically used within industrial robots for determining the angle of pivoting of the respective robot members. Based on those data and by use of the geometry of the robot members it is possible to determine the actual position of the robot arm respectively the TCP therefrom. The actual position data are normally used as input data for a control loop for the drives of the robot which cause the posture of the robot. Also when a control loop is foreseen an actual position of a robot arm might subject to a deviation from the desired position.

Anticipatory determining a real actual position implies, that basically a position in the nearest future is estimated, for example the position of the TCP in 50 ms or such. This feature is required for a further embodiment of the invention, according to that it is foreseen to apply a respective portion of print material only in that case that the (anticipatory) determined real actual position of the at least one print nozzle is corresponding to a respective coordinate according to the object data of the robot program, wherein of course a certain range of tolerance is assumed.

In other words, if a print nozzle respectively the TCP is passing a respective coordinate according to the object data of the robot program, a portion of print material is applied. If there is a deviation which is exceeding a certain limit, the application of the respective portion of print material is suppressed. Thus it is avoided that a portion of print material is applied on a position with a significant deviation, which is larger than a tolerance, for example 0.5 mm.

In principal two kinds of deviations exist. According to the first variant the real movement path corresponds to the predetermined movement path, but there is a difference in between real and desired movement speed. In this case the application of a portion of print material is not suppressed at all but time-shifted to that moment in time, when the print nozzle is passing a respective coordinate according to object data of the robot program. According to the second variant the real movement path does not correspond to the predetermined movement path, thus a respective coordinate according to object data of the robot program is not reached at all and applying respective portions of print material is suppressed in this case.

To avoid a double application of a portion of print material it is foreseen according to a further embodiment of the invention to apply a respective portion of print material only once per respective coordinate according to object data of the robot program. Thus a portion of print material is applied once, if the print nozzle is passing a respective coordinate according to the object data of the robot program and if the same coordinate is passed once again, no further portion of print material is applied. Thus for each coordinate the information has to be stored—for example in a memory of the control unit—whether an application already has been carried out or not.

To ensure, that a portion of print material is also applied at those respective coordinates according to the object data of the robot program, which have been skipped due to a too large deviation of the movement path, the following embodiment of the printing system for three-dimensional objects is foreseen. This is characterized in that the control unit is prepared to adapt the predetermined movement path in that way, that—in case of not having applied a portion of print material due to a deviation of a respective real actual position from a respective desired position according to the predetermined movement path—the respective coordinate for applying the respective portion of print material is approached again by the at least one print nozzle. Thus after having printed a layer of the object to be printed an additional path could become appended according to that all missing coordinates of this layer are approached. This has to be repeated until all respective coordinates of the layer have been applied with a respective desired portion of print material before the next layer is applied.

According to a further embodiment of the invention the printing unit comprises several individual controllable print nozzles for applying independently each from each other pointwise a respective portion of a print material. A printing unit could for example comprise a row of ten print nozzles which are preferably oriented perpendicular to the movement direction of the tip of the robot arm. Preferably the distance in between adjacent nozzles should correspond to the typical distance of coordinates to be applied in the case that they are defined in a type of three-dimensional matrix or a multiple distance therefrom. Thus it is possible to apply several portions of print material in parallel.

In general, the probability, that one of several print nozzles is passing a respective coordinate according to object data of the robot program is higher than for one single print nozzle. By this reason it is also within the scope of this invention to provide a printing unit with for example four print nozzles which are very close together. The whole printing unit is moved along a predetermined path, wherein certain deviations from a desired predetermined movement path might occur. That print nozzle with the lowest deviations to a respective coordinate will be foreseen for applying a respective portion of print material thereon. The accuracy of printing a three-dimensional object will become increased therewith.

According to a further embodiment of the invention the printing system for three-dimensional objects it is foreseen to apply the respective portions of print material layerwise. Typically a three-dimensional object is printed layerwise from bottom to top. A portion of print material in the $n^{th}$ layer cannot be applied if a respective portion of print material in the $(n-1)^{th}$ layer below has not been applied. In case that some coordinates of a layer have been skipped while applying print material, those coordinates are approached again and print material is tried to apply again thereon before applying the next layer.

According to a further embodiment of the invention the predetermined movement path is meander-like and determined in that way, that the tip of the robot arm is preferably not subject to an acceleration while applying respective portions of print material at respective coordinates according to object data of the robot program. A meander-like movement path is in particular suitable to cover matrix-like arranged coordinates of a layer of a three-dimensional object to be printed. In the case that an acceleration of the tip of the robot arm is avoided, an anticipatory determining of a real actual position is simplified in an advantageous way.

According to another embodiment of the invention the predetermined movement path is determined in that way, that only one robot member is subject to an active movement while applying respective portions of print material at respective coordinates according to object data of the robot program. Thus the robot movement is on one side rather smooth since it is not composed of a sum of several movements of several robot members. A turning movement of an otherwise static robot arm around its rotary base is an example for this. On the other side such a movement is rather easy predictable as it is required for the anticipatory determining of the actual position, which might be 30 ms in advance for example.

Further advantageous embodiments of the invention are mentioned in the dependent claims.

FIG. 1 shows an exemplary printing system 10. A three-dimensional object 12 becomes printed by a robot, which comprises a first robot member 16—a rotary base, a second robot member 18, which is pivotable along a movement direction as indicated with an arrow 20, a third robot member 22, which is pivotable along a movement direction as indicated with an arrow 24 and a fourth robot member 26, which is pivotable along a movement direction as indicated with an arrow 28. Furthermore the robot is movable along a seventh axis 38, as indicated with the arrow 42.

All robot members 16, 18, 22, 26 are pivotable connected in a kind of chain, which is representing the robot arm. At the tip of the robot arm a printing unit 30 is foreseen for applying respective portions 32, 34 of a print material on the upper surface of the three-dimensional object 12. The printing unit 30 comprises several print nozzles, so that several portions 32, 34 of a print material can be applied synchronously.

A control unit 14 respectively a computing unit is foreseen to run a robot program thereon, which comprises as well path data as object data. According to the data of the robot program the control unit provides signals to the several robot drives via a connection line 44. The robot drives comprise typically rectifier for generating a respective electrical signal for the belonging motors.

The control unit 14 also receives data from a vision system 40 via a connection line 46. The vision system 40 is prepared for anticipatory determining the real actual position and orientation of the printing unit 30 respectively the print nozzles. Based thereon the actual coordinates of the TCP are derivable. Basically it is sufficient to determine the coordinates and orientation of a reference point of the printing unit 30 and derive—based on the geometry of the printing unit 30—the TCP of one or more print nozzles therefrom.

Figure 2:
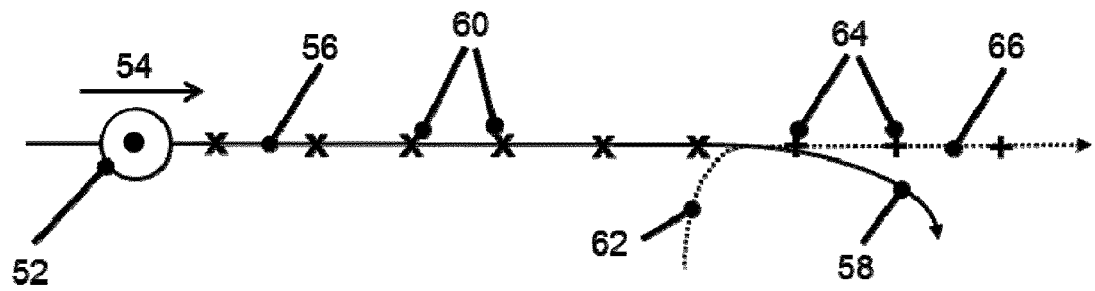
FIG. 2 shows a first exemplary movement path with coordinates for applying print material.

FIG. 2 shows a first exemplary movement path with coordinates 60, 64 for applying print material in a sketch 50. An exemplary print nozzle 52 is moved along a section 56 of a predetermined movement path in a direction 54. In this section there are no significant deviations of the real movement path to the desired predetermined movement path. The "x" 60 show respective coordinates according to object data of the robot program where a respective portion of a print material has to be applied. Since there is no deviation of the print nozzle 54 in the section 56 of the predetermined movement path, a respective portion of print material will be applied by the print nozzle 52 when passing the respective coordinates 60.

Subsequent to the first 56 section of the desired predetermined movement path a second section is following, which is marked with a dotted line. The respective coordinates according to object data of the robot program where a respective portion of a print material has to be applied are marked in this section with a "+" 64. The respective real section 58 of the movement path is differing from the desired one. Due to a too large difference of the respective coordinates no portion of print material will be applied at the respective coordinates 64 according to object data of the robot program.

The printing system is foreseen to check whether print material has been applied at each coordinate of a layer before switching to the next layer. Since no print material has been applied at the coordinates 64 at this stage, the predetermined movement path is adapted in that way that the respective coordinates 64 for applying the respective portions of print material are approached again by the print nozzle 52. A section of the adapted path is marked with reference number 62 and followed by the section 66, which both are displayed as a dotted line. The print nozzle 52 is then moved along the section 66 of the adapted desired movement path without any significant deviations, so that a respective portion of print material is applied when passing the coordinates 64.

Figure 3:
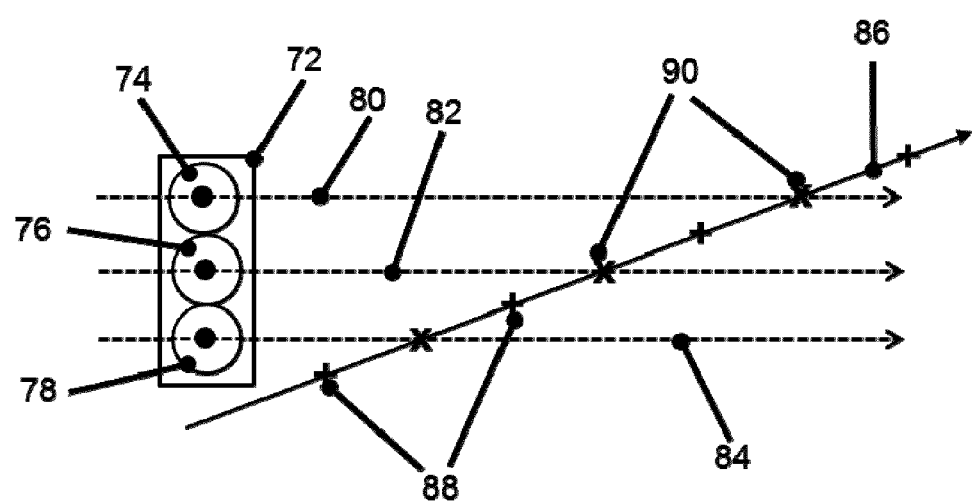
FIG. 3 shows a second exemplary movement path with coordinates for applying print material.

FIG. 3 shows a second exemplary movement path with respective coordinates for applying print material in a sketch 70. Three print nozzles 74, 76, 78 of a printing unit 72 are moved along respective parallel paths 80, 82, 84. A predetermined movement path 86 is angulated thereto and comprises first 88 and second 90 coordinates according to object data of a robot program. While passing over the predetermined movement path 86 respectively the coordinates no print material will become applied at the first coordinates 88 since there is a too large deviation in between coordinates 88 and parallel paths 80, 82, 84 of the print nozzles. While passing the second coordinates 90 a respective portion of print material will become applied since there is no significant deviation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS 10 exemplary printing system
12 three dimensional object
14 control unit
16 first robot member
18 second robot member
20 movement direction of second robot member
22 third robot member
24 movement direction of third robot member
26 fourth robot member
28 movement direction of fourth robot member
30 printing unit
32 first portion of print material
34 second portion of print material
38 seventh axis
40 vision system
42 movement direction of first robot member along seventh axis
44 first connection line
46 second connection line
50 first exemplary movement path with coordinates for applying print material
52 exemplary print nozzle
54 movement direction of print nozzle
56 predetermined and real section of movement path (congruent)
58 real second section of movement path
60 first coordinates for applying print material (corresponding position)
62 first section of adapted movement path
64 second coordinates for applying print material (not corresponding position)
66 second section of adapted movement path
70 second exemplary movement path with coordinates for applying print material
72 printing unit with tree print nozzles
74 first print nozzle
76 second print nozzle
78 third print nozzle
80 real movement path of first print nozzle
82 real movement path of second print nozzle
84 real movement path of third print nozzle
86 predetermined movement path of printing unit
88 first coordinates for applying print material (corresponding position)
90 second coordinates for applying print material (not corresponding position)

The invention claimed is:

1. A printing system for three-dimensionally printing a three-dimensional object, the system comprising:
   a control unit configured to store and execute a robot program;
   an industrial robot which is controlled by the control unit, the industrial robot including an arm including a plurality of members, the arm including , according to path data of the robot program;
   a printing unit, mounted on the tip of the arm, and controlled by the control unit, the printing unit including a print nozzle configured to apply pointwise a respective portion of a print material at respective coordinates according to object data of the robot program; and
   wherein the control unit is configured to make an anticipatory determination of a real actual position of the print nozzle,
   wherein the system is configured to suppress an application of a respective portion of print material if a difference between an anticipatory determined real actual position of the print nozzle and a respective coordinate according to the object data of the robot program exceeds a certain limit, and
   wherein the system is configured to three-dimensionally print the three-dimensional object by pointwise applying a plurality of the respective portion of the print material that hardens after application into a point- and layerwise solid printed object.

2. The system of claim 1, wherein the industrial robot is a paint robot with a high accuracy along an entire movement path.

3. The system of claim 1, wherein the industrial robot includes at least six members with six degrees of freedom in movement.

4. The system of claim 1, wherein the system comprises an anticipatory determinator that comprises an acceleration sensor, resolver, encoder, laser interferometers, or combination of two or more of any of these, for a respective axis of the robot, wherein the control unit is configured to receive one or more respective measurement values from the anticipatory determinator, and wherein the control unit is configured to anticipatorily derive the real actual position of the print nozzle from the respective measurement values.

5. The system of claim 1, configured to apply a respective portion of print material only once per respective coordinate according to the object data of the robot program.

6. The system of claim 1, wherein the control unit is configured to adapt the predetermined movement path such that, that in case of not having applied a portion of print material due to a deviation of a respective real actual position from a respective desired position according to the predetermined movement path, the respective coordinate for applying the respective portion of the print material is approached again by the print nozzle.

7. The system of claim 1, wherein the printing unit includes several individual controllable print nozzles configured to independently apply pointwise a respective portion of a print material.

8. The system of claim 1, configured to apply the respective portions of print material layer-wise.

9. The system of claim 1, wherein the predetermined movement path is determined such that only one robot member from the plurality is subject to an active movement while applying the respective portions of print material at respective coordinates according to the object data of the robot program.

10. The system of claim 1, wherein the industrial robot is a paint robot.

11. The system of claim 1, wherein the printing unit includes more than one print nozzle.

12. The system of claim 1, wherein the predetermined movement path is determined such that the tip of the arm is not subject to an acceleration while applying the respective portions of print material at respective coordinates according to the object data of the robot program.

13. The system of claim 1, wherein the control unit is configured to control the industrial robot to move the tip along the predetermined movement path prior to, during, and after controlling the printing unit to suppress the application of the respective portion of print material.

14. The system of claim 1, wherein the predetermined movement path is meander-like.

15. The system of claim 14, wherein the predetermined movement path is determined such that the tip of the arm is not subject to an acceleration while applying the respective portions of print material at respective coordinates according to the object data of the robot program.

* * * * *